(12) United States Patent
Avina

(10) Patent No.: US 8,016,917 B2
(45) Date of Patent: Sep. 13, 2011

(54) METHOD AND APPARATUS FOR POLLUTION CONTROL OF CONFINED SPACES

(76) Inventor: David Christopher Avina, Bay Saint Louis, MS (US)

(*) Notice: Subject to any disclaimer, the term of this patent is extended or adjusted under 35 U.S.C. 154(b) by 197 days.

(21) Appl. No.: 12/454,061

(22) Filed: May 12, 2009

(65) Prior Publication Data

US 2010/0116135 A1    May 13, 2010

Related U.S. Application Data

(63) Continuation-in-part of application No. 11/001,811, filed on Dec. 1, 2004, now Pat. No. 7,569,089.

(51) Int. Cl.
*B01D 59/26*    (2006.01)

(52) U.S. Cl. .................. 95/90; 95/108; 96/108; 96/135; 96/150; 96/154

(58) Field of Classification Search .............. 95/90, 108; 96/108, 122, 131, 135, 150, 154; 416/93 R; 422/145, 147

See application file for complete search history.

(56) References Cited

U.S. PATENT DOCUMENTS 2,602,019 A * 7/1952 Odell ..................... 423/437.1

* cited by examiner

*Primary Examiner* — Robert A Hopkins

(57) ABSTRACT

A method of improve the removal of particulate matter, heavy metals, neutralizing acid, and kill microorganism pollutants, known to be in contaminated air volumes of occupied confined spaces, when exposed in close contact under pressure to a mixture of alkaline sorbent materials, having a known synergism between said pollutants using a self propelled fluidized bed reactor and packed bed filter apparatus system to optimize the contact collection efficiency of submicron particles and organic compounds.

9 Claims, 6 Drawing Sheets

METHOD AND APPARATUS FOR POLLUTION CONTROL OF CONFINED SPACES

CROSS REFERENCE TO RELATED PATENTS AND APPLICATIONS

This invention is a continuation-in-part of U.S. patent application Ser. No. 11/001,811, filed Dec. 1, 2004, now U.S. Pat. No. 7,569,089, and this application is a divisional is part B of the said earlier application. This invention is a based on prior art U.S. Pat. No. 6,451,091 B1, entitled "Apparatus and Method for Emissions Control Through Continuous Filtration System" and U.S. patent application Ser. No. 10/867,943 filed on Jun. 14, 2004 entitled "Method And Apparatus For Combined Cycle Fluid Propulsion"

BACKGROUND OF INVENTION

This instant invention relates to a method and apparatus useful in the removal of harmful pollutants known to be found in occupied confined spaces to the improvement of indoor air quality. A 1989 EPA Report to Congress concluded that improved indoor air quality can result in higher productivity and fewer lost workdays. EPA estimates that poor indoor air may cost the nation tens of billions of dollars each year in lost productivity and medical care. The National Energy Management Institute (NEMI) reports that approximately 80% of commercial buildings do not comply with engineering standards to provide the best indoor air quality for building occupants. The main pollutants found in indoor confined spaces are: Volatile Organic Compounds: (VOCs), are commonly acetic acid, ammonia, hydrogen sulfide, benzene, toluene, and formaldehyde associated with solvents from, floor and wall construction materials. Ozone: O3 is as a powerful oxidant found in nature and generated by printing process, this pollutant is also known to be toxic to humans in small concentrations above 10 ppm. Ozone is a health hazard that can cause eye and mucous membrane irritation and chronic respiratory disease. Carbon Monoxide: (CO) OSHA regulates levels of CO for industrial settings, but a level lower than 2 ppm is typical in an office setting. Airborne Bacteria, Mold and Fungi: No regulations have been established for biological contaminants, however a range of acceptable levels has been recommended to be less than 700 spores in a cubic meter of air. Environmental Tobacco Smoke (ETS) is a known carcinogen which can exist in the indoor air. Radon Gas, is a known carcinogen which causes thousands of cancers cases per year.

Current indoor environment pollution control technology is unable to provide one system to filter particulate matter, absorb VOC's, neutralize acids, capture heavy metals, and provide a 99.99% kill rates of all known microorganisms. In addition to insufficient control capability the present technologies in the retail and commercial market have a inherent health risk over seen by current studies which involves user handing of dirty filters during replacement, as filters are removed exposure is many times higher than normal breathing air in a contaminated room. Other aspects of prior art technology have been known to be harmful and have been reported in EPA studies and many other government agencies. In the case of ozone, which is finding an ever increasing usage in the retail markets the hazardous to human health of the users as outlined by the Environmental Protection Agency, Occupational Safety and Health Administration, Food and Drug Administration, and the National Institute of Occupational Safety and Health which have set very low limits on ozone exposure all of which are below 10 parts per million. These ozone generators emit trillions of times more than the safe limit into confined spaces on a daily basis.

Other more recent considerations exist for improved treatment of confined space air quality associated with indoor air, highlighted by September 11th and mailing of anthrax spores continual present a threat to the U.S. Homeland Defense which is seeking highly effective means to reduce the threat of biological and chemical weapons of mass destruction such as anthrax and nerve gases to improve U.S. National Security.

In accordance with the present invention, however, it has been found that the combination of certain air treatment processes is unnecessary to provide a solution to the removal of all indoor pollution, and resolving a National health hazard exists in a simplified version currently used in flue gas scrubbing. This method known to be effective in the collection of all of the said pollutants requiring treatment. The current invention absorbs VOC's, neutralizes acids, traps heavy metals, absorbs nitrogen oxide, collects PM down to 0.01 microns in diameter.

In addition to the chemical, acid, and heavy metal recovery this method as applied in the present invention also has is known to kill microorganism including viruses, bacteria, fungi, mold, and spores on contact. The present invention as an anti-acid offers the opportunity to absorb and neutralize nerve gases, and kill anthrax spores.

FIELD OF THE INVENTION

The most efficient methods known in air pollution control are found in application controlling flue gas emissions from utility and industrial processes, known as flue gas scrubbers (FGS). This technology has been repeatedly tested over the past 10 years as required by State Governments by the Clean Air Act. The method applies a known process of pollutant contact with an alkaline sorbent know be a highly reliable and efficient processes in the control of emissions. The present invention applies the method sorbent treatment method in a unique way by fluidized bed suspension using a mixture of well known alkaline sorbent materials having a porous and reactive surface. As contact proximity is known to being a key factor in effectiveness in absorbing chemical pollutants and current technology applies this method in FGS treatment to fluid stream by sorbent injection, combustion injection, and alkaline spray treatment all unpractical in indoor environments. The current invention uses fluid flow process known as fluidization to maximize alkaline contact in air stream treatment of confined space. In addition it is also known in flue gas streams that some agents used in this process react under heat to increase contact area and improve absorption by decomposition developing a greater surface area. Some sorbents are used because of their porous nature when treated by heat prior to injection and are found effective treatment process such as active carbon, which is treated by heat in its manufacturing process. Some alkaline agents are injected into a hot gas stream and decomposition occurs inset sue as in the decomposition of lime stone into calcium carbonate its increasing absorbance ability yet unstable at lower temperatures. Sodium bicarbonate is also used in injection into hot gas streams and decomposes into sodium carbonate developing contact surface areas similar to activated carbon increasing absorbency. The present invention applies a pretreatment of sodium bi carbonate prior to application to improve its application as it applies in the present invention. It is also known that in the art that differential pressure is another key factor in filtration efficiency in the removal of small particles. In FGS treatment it has been found that a coating of sorbent material placed upon tightly meshed screen is more effective as the coating increase improving efficiency. As Fluidized bed reaction and filter systems have been used in prior art applications with some effectiveness the opposing operation of these process has limited application of the treatment of contaminated fluid streams with significant particulate grain loading. It is known in the art that the application of fluidize bed only occurs with particles diameters greater than 150 microns, and that packed beds are most efficient when particles below 60 microns are used. As the segregations of the two particle sizes is necessary to each process for maximum efficiency. The present invention applies this knowledge by the incorporation of separation between the two process to maintain fluidized bed integrity and precoating of a filter substrate with small diameter particles maximize efficiency of both processes. As these both process are fluid stream pressure and velocity dependent to be effectively the utilization in the present invention of a boundary layer turbine fluid propulsion improves the art by presenting a novel approach in a modified version to provide simplified construction and application to generate the pressure and velocity necessary create a high pressure differential across said filter and velocities capable of fluidization of a solid bed required for a react surface area to occur sufficiently to improve efficiency.

SUMMARY OF INVENTION

In accordance with this instant invention, that utilizes applications and processes known in the art of air pollution control to remove pollutant constituents from a flowing gas stream under pressure through the application of a plurality of alkaline sorbents configured in a manner to absorb pollutants in said gas steam by contact with a full cross sectional area of said sorbent arranged upon a surface of a porous substrate having a plurality of inlets and outlets to allow to said gas to flow through said porous substrate and into the said alkaline sorbent bed comprised of a granular particles contained within a confined space. It is also known in the art that; a directional change to a flowing gas containing entrained particles will cause a large number of the particles to divert from the said flowing gas stream and respond to gravitational force collecting at the lowest point possible. It is also known in the art that contaminated gas flow under pressure will compress a densely packed layer of small diameter alkaline powder (<65 micron) applied to the surface of a porous substrate attached across the inlet and of a flowing gas stream, having a plurality of outlets to provide an efficient means to capture extremely small diameter particles, neutralize acids, absorb volatile organic compounds, capture heavy metals, and particle matter, and kill microorganisms retaining these pollutants within the said packed bed and allowing un-contaminated gas to pass through said bed. The present invention applies these known process in a novel way enclosure of these three processes principles within a first confined space (cartridge) housing having inlets and an outlets, set within a second outer housing containing a propulsion having a prime mover and speed controls, and enabled by a set of pressure switches set between the propulsion system and the fluidized bed plenum to register pressure set points in a way to warn low pressure and high pressure operation stalling operation in the event of set point obtainment.

BRIEF DESCRIPTION OF THE DRAWINGS

FIG. 3b. is a vertical cross section of a simplified cartridge have a fluidized bed, and a packed filter.

FIG. 7a. is transverse vertical view of flow conduit coupling attachment showing spoked attachments, FIG. 7a. C-C is a horizontal cross section of a spoke used in hub attachment to outer coupling attachment. FIG. 7c. is a vertical cross section of coupling attachment.

DETAILED DESCRIPTION

Figure 1:
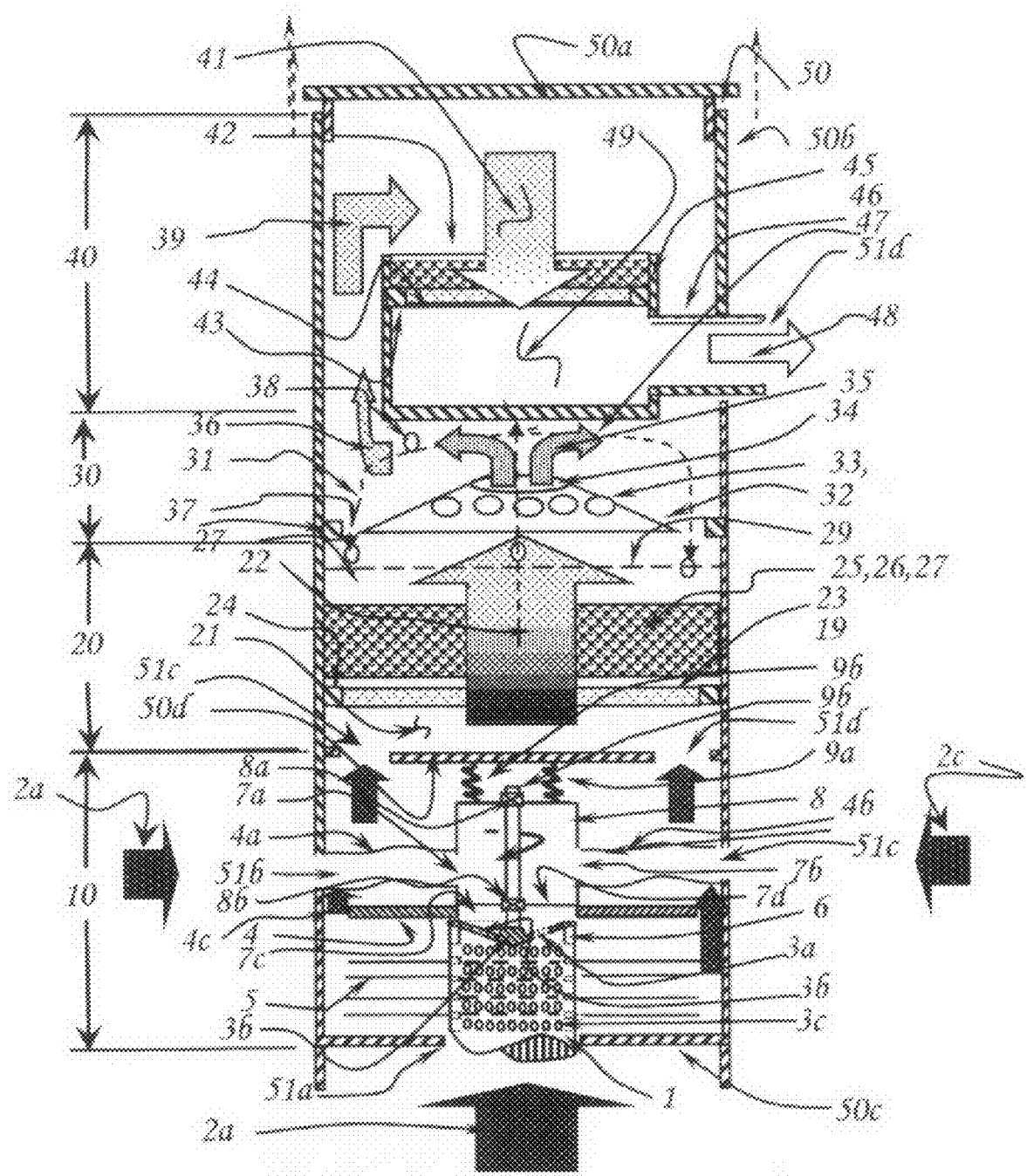
FIG. 1 is a vertical cross section of a simplified version of the embodiment of Pollution Control process and apparatus.

The present invention will be described with reference to the accompanying drawings which assist in illustrating the pertinent features thereof. The apparatus illustrated in FIG. 1, is a basic flow diagram of this instant air filtration invention, supplemented by U.S. patent application Ser. No. 10/867,943 filed on Jun. 14, 2004 entitled "Method And Apparatus For Combined Cycle Fluid Propulsion", dealing with the boundary layer propulsion apparatus method of operation, supplemented in present art to stated the mode of operation as applied to the present air filtration apparatus currently under presentation in this invention.

In the current invention an occupied confined space (not shown) having contaminated air and represented in the current embodiment by confined space inlet air containing volatile organic compounds, heavy metals, acids, particulate matter, and living microorganisms, in said supply (2a, 2b, 2c), is induced into an enclosure (50), having an inner and outer surface having walls (50b), having a second outlet opening (51d), and a first main inlet opening (51a), and a first secondary inlet opening (51b), and a third secondary inlet opening (51b), also having an upper wall (50a) with an inner and outer surface and independent side wall capable of sealing against side walls (50b), for seal and detachment to said housing (50), and a lower wall (50c), having an inner and outer surface with a first main inlet opening (51a), and being resisted from the end of said housing (50b), creating an inlet plenum with a plurality of supports. Mounted within the interior of said housing (50), resides a dividing wall (50d), having an inner and outer surfaces and a plurality of openings (51c, 51d), said wall (50d) providing channeled air flow from and to the occupied confined space and mounting for a Boundary Layer Turbine apparatus contained within a first confined space (10), containing a boundary layer propulsion apparatus (1), providing inducing flow through inlet suction provide through the mechanical rotation of flow conduit (6), by mechanical means provide by prime mover (8), have a first opening (7d), in communication with a first end of first flexible conduit (4a), and a second end in communication with said outlet (51a), and also having a second opening (7b), in communication with a first end of second flexible conduit (4a), and a second end in communication with said outlet (51b), and a third outlet opening in the base of said prime mover housing (8), said prime mover also having upper a plurality of shock resistant attachments represented by (9a, 9b) having a first end attached to the lower surface of said dividing wall (50d), and a second end fixed to the upper end of prime mover housing (8). Prime mover (8), also having a first roller bearing (8a) enclosing the circumference of primer mover armature (9b) having a first end and a second end attached to a second roller bearing (8b), containing the lateral movement of said primer mover armature (9b) and also attached to flow conduit coupling (3b), having a plurality of openings (3a,3b), and in communication with boundary layer turbine flow conduit (6) having a first end, and a second end in communication with a plurality of manifold ports embodied in this figure by (3c), spaced between plurality of boundary layer disks (5), known to impart motion in a free flowing fluid, when placed into motion through the applied rotation from prime mover (6) fixed to the upper surface of the Turbine Rotor Enclosure wall (4), having a first and second surface, and a plurality of openings in the outer circumference between said enclosure wall (4) and housing wall (51b), and a central opening set about the circumference of the lower end of prim mover (8) to communicate flow from the interior of prim mover (8) and the second end of turbine rotor flow conduit (6) provided for inlet air flow across prime mover for temperature reduction. As prime mover (8) applies rotation air flow is induced through said prim mover (8) and through main inlet (51a) into the flow conduit (6), passing through said plurality of manifold openings (3c), into spaces between boundary layer disks (5) at pressure and velocity, past prime mover (8), through said plurality of openings (4c), in said turbine wall (4), into a plurality of openings (51c, 51d), in into the plenum (51c) in the lower section of Fluidized Bed Reactor (20), designed to distribute the said untreated stage one (2a,2b,2c) contaminated inlet air supply obtained for and occupied confined space is evenly forced in a distributed manner throughout the plenum section (21), and distributed through a substrate (23), with an inner and outer surface, and retained by holder (24), affixed to the interior wall (50b), through pressurized for of 4 inches of water column lifts a bed from a compacted state and expanded fluid state known in the art as fluidized bed, to a freeboard distance above the compacted state height illustrated by dashed line (27), that exposes the said stage one air contaminated air supply (22), to an alkaline sorbent bed mixture comprised of sodium bicarbonate (25), sodium carbonate (26), and activated carbon (27), as fluidized beds are known to provide a residents duration and a full contact surface as forced flow is diffused through the bed, so that the area reaction is maximized for chemical bonding to take place between chemical species, acidic, metal, and microorganism contaminated in said stage one air supply (22), and said sorbent bed (20), prior to entering a particle separator (30) section. Particle Separator having a sloping surface diverter plate (32), with a plurality of openings (37), at the outer edge for the gravity discharge of dislodged particles (38), and a central opening (34), and a plurality of openings (33), designed to channel air flow (22), against the center of the outer surface of confined space (46), separating entrained sorbent particles (36), through velocity reduction caused by impact on said surface (46), and plurality of 90 degree directional changes illustrated by (35),(36), and (39) or 180 degrees, as it is known in the art that flow directional changes and surface impacts reduced particle velocity of entrained particles and is an effective separation method, there by being allowing gravity to returning said particles (37),(38), illustrated by dashed path arrow (31), back to said fluidized bed (20), for reapplication in the fluidized bed reactor. As stage two air flow (41), enters the surface of packed bed filter (42), comprised of small diameter particles less than 80 micron of alkaline sorbent (sodium bicarbonate, sodium carbonate), (42a), (42b), and non alkaline activated carbon (42c) known to assist in the removal of elemental mercury, in communication with and supported by porous substrate (44), having an inner and outer surface supported at the outer edge by retaining support (43), forming the upper permeable wall of confined space walls (40), in communication with outlet opening (51d), through conduit (46), having a first end fixed to wall (45) and a second end fixed to said opening (51d).

Figure 2:
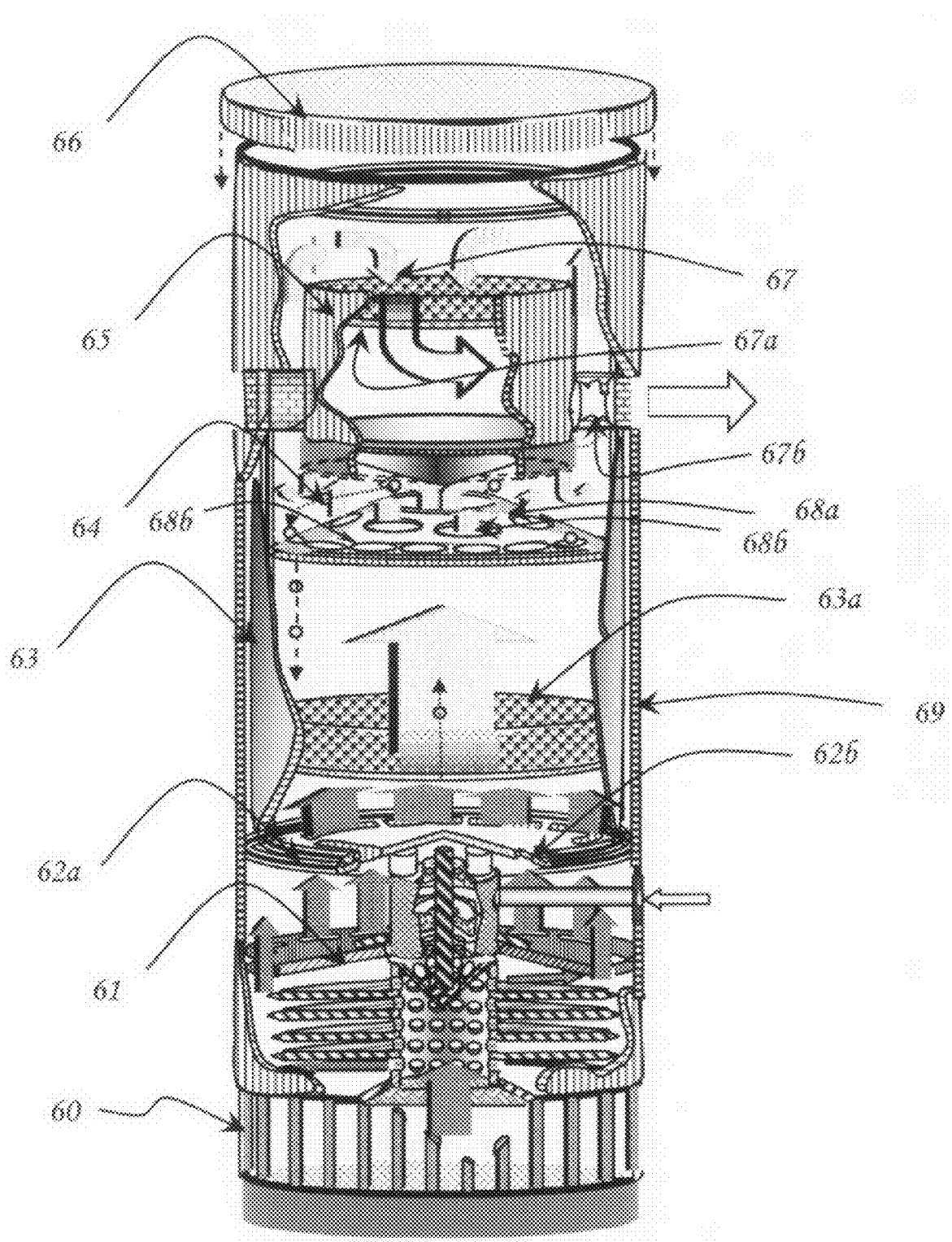
FIG. 2 is a vertical cutaway cross sections of an embodiment of the invention utilizing a cartridge filter application the apparatus.

FIG. 2 is a vertical cutaway cross sections of an preferred embodiment of this invention utilizing a first confined space cartridge(63), containing the sorbent treatment filtration system, held within a second confined enclosure (69), provide with a propulsion system (61), inducing said flow into a first open end cartridge (63), plenum of having lower compressible seal (62b), compressed against a second enclosure seal (62a), fixed to the inner wall of said enclosure (69), with said cartridge system (63), containing a fluidized bed (63a), a diverter plate (68a), having a first plurality of openings (68b), for the flow of air, and second plurality of openings for the flow of disengaged particles (64), and a third confined space (65), supporting a packed bed filter (67) by way of a porous substrate (67a), affixed to said pack bed confined space (65), and in communication with the exterior of said enclosure (69), through a first and second flexible conduit connectors (67b), accessible through a removable cover (66).

Figure 3:
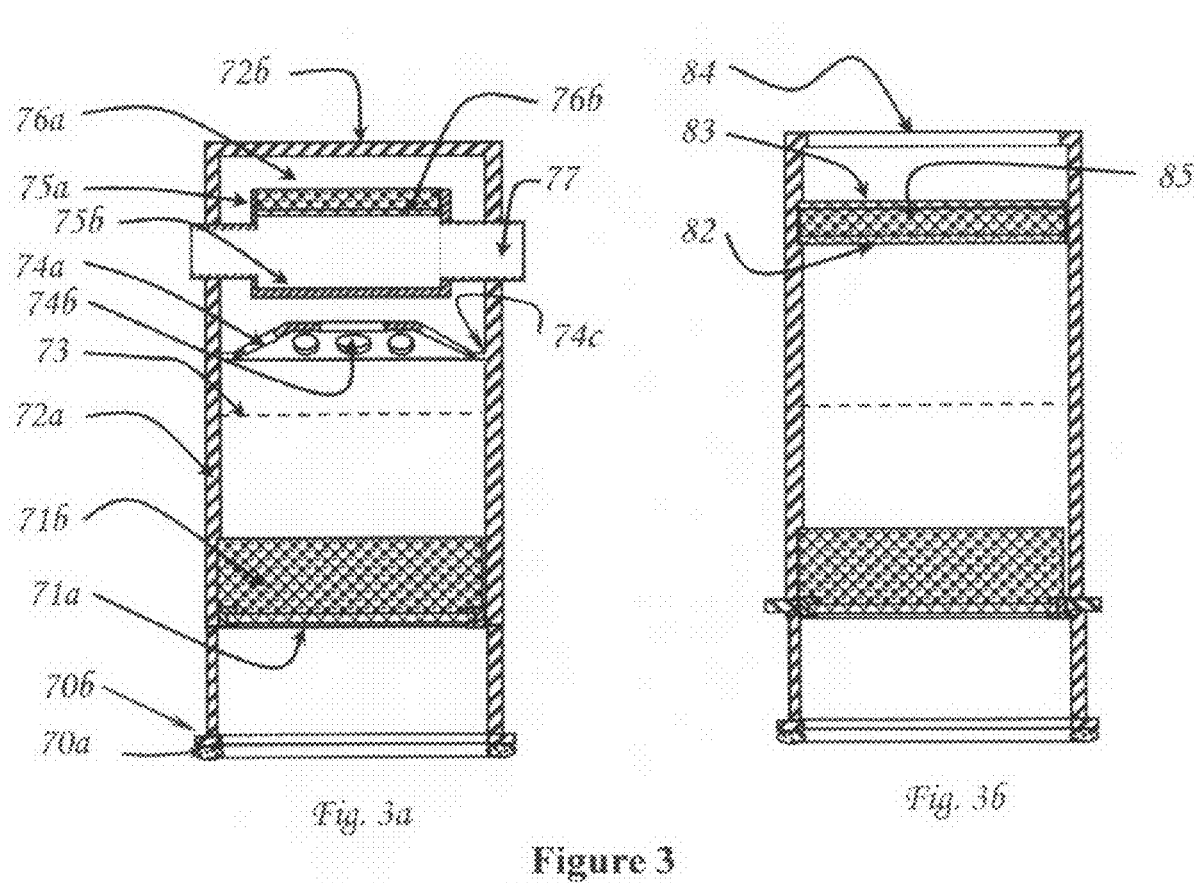
FIG. 3 is a vertical cross section of a cartridge filter systems showing (FIG. 3a), is a vertical cross section of a cartridge with a fluidized bed reactor, a diverter cone, and a packed bed filter system.

FIG. 3 A vertical cross section of two embodiments of cartridge filter systems showing a preferred design (FIG. 3a), having a first confined space with vertical walls (72a) with an inner and outer surface, a horizontal top (72b), with an inner and outer surface, fixed to a first end of said walls (72a), and a horizontal surface fixed to a first end of said walls (72a), and having a second end fixed with compressible seals (70a), fixed to a flared end (70b), of extended walls (72a), said first confined space having a first porous substrate (71a), having a inner and outer surface, affixed to said walls (72a), in communication with the second open end of said cartridge, supporting fluidized bed (71b), comprised of said sorbents described in figure one, and having an expandable freeboard space limited by dotted line (73), and having a diverter plate (74a), with a first plurality of openings (74b), for the passage of air, and also having a second plurality of openings (74c), for the passage disengaged particles, set below a second confined space having walls (75a), to support a second porous substrate support (76b), having an inner and outer surface, affixed to said walls (75a), and supporting and packed bed filter (76a) as described in figure one, in communication with first confined space and the interior of said second confined space, having a horizontal surface arranged in the lower segment of said confined space, with a first and second outlet (77a, 77b) for the passage of air as previously described in figure one. FIG. (3b), is a simplified embodiment of FIG. (3a), having identical said walls, seals, porous substrate supports, and provide the elimination of diverter plate, (74a) and confined said second packed bed filter space chamber, and said plurality of outlets, replaced by a compressed packed bed held between a first porous substrate support (82), and a second substrate support (83), with a packed bed region containing identical sorbent material as previously described in figure one, and held between a said first substrate support (82), and said second substrate support (83), each affixed to chamber side walls allowing air to flow our an open end of said first confined space allowing greater cross sectional are for flow.

Figure 4:
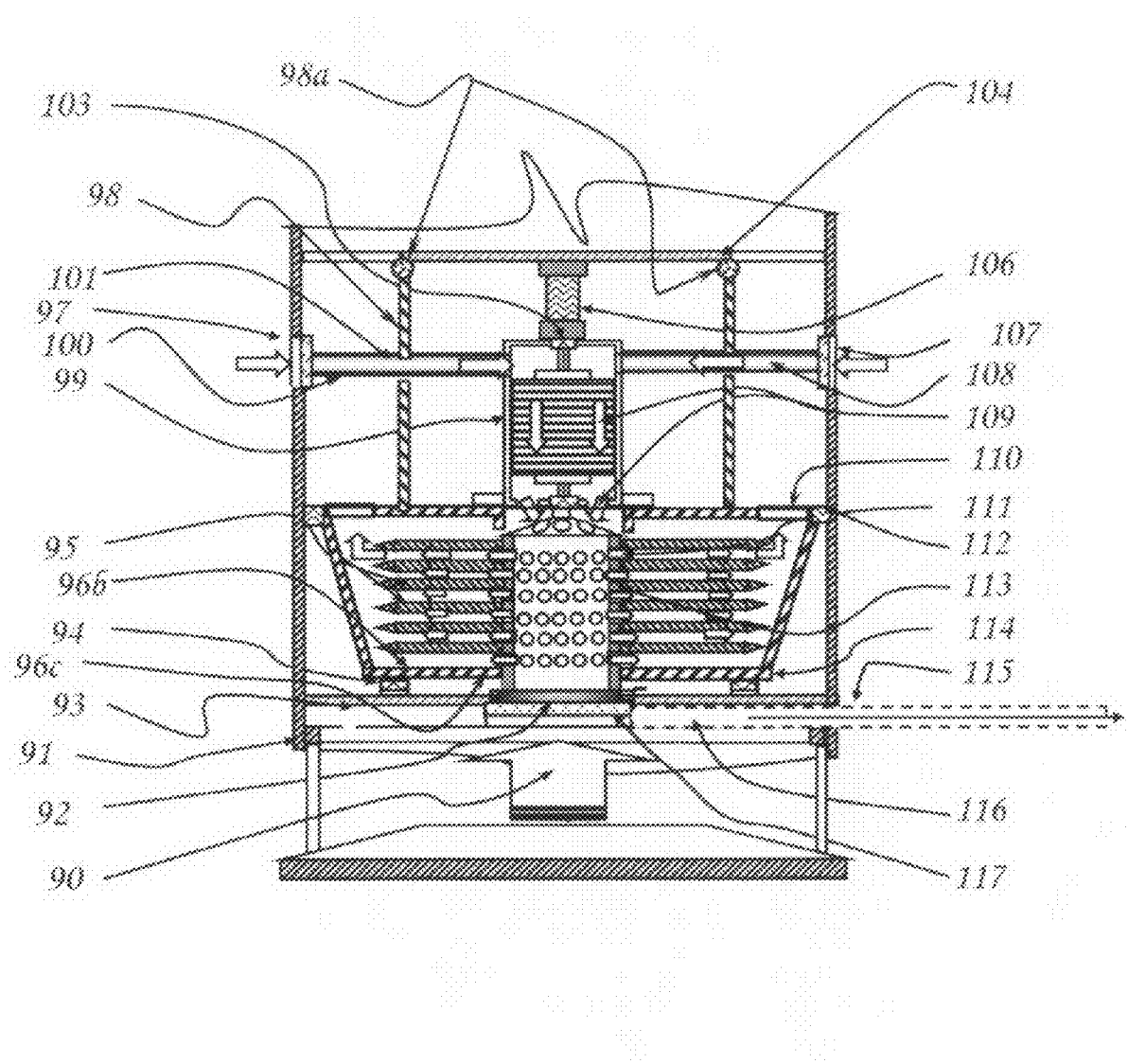
FIG. 4 is a vertical cross-sections of one embodiment of the boundary layer propulsion system utilized in the invention.

FIG. 4. is a vertical cross section of boundary layer turbine as described in figure one, having of a said confined space air flow (90), into said opening (92), protected by a screen (117), removable by slide attachment (115), set in said outer enclosure vertical walls (91), to capture large dust particles, fixed into a horizontal lower housing wall (93), having a first and second surface, with a central opening (92), for air inlet to flow conduit (113), in support of turbine housing (114), having slanted vertical walls, and an first upper horizontal wall (96*a*), with central opening (109), and a plurality of openings (110), arranged about the outer circumference of said wall (96*a*) with a second lower horizontal wall (96*b*) having and inner and outer surface with a central opening (96*c*), as the main inlet port, with a plurality of flexible supports (94), vertically supporting said turbine, and having flexible seals (112), affixed to said sloping vertical walls (114), and in compression with said outer vertical walls of enclosure (91), and also supported by a central flexible support (106), said internal horizontal wall (104), and prime the upper section (103). Prime mover (99), in communication with the exterior of said confined space (91) through a first flexible conduit (100), and a second flexible conduit 108), having a first screen (97), and a second screen (107) to capture large dust particles, of prime mover (99). This embodiment include a central channel (98), having vertical walls with a first end attached to horizontal wall (110), and a second end attached to horizontal wall (104 by way of flexible connector seal, (98*a*).

Figure 5:
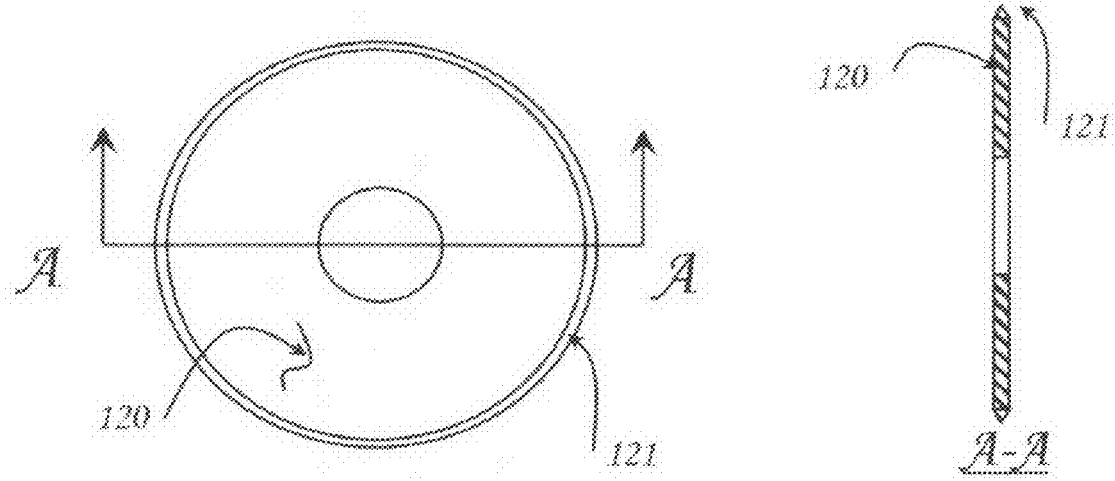
FIG. 5 is boundary layer disk details, showing, plate design details showing FIG. 5a transverse section of disk, and FIG. 5b, vertical cross section of plate. 5c. is a cross section of FIG. 6. is transverse vertical view of flow conduit coupling attachment, FIG. 6a. is a vertical cross section of coupling attachment with exterior interior placement.
Figure 6:
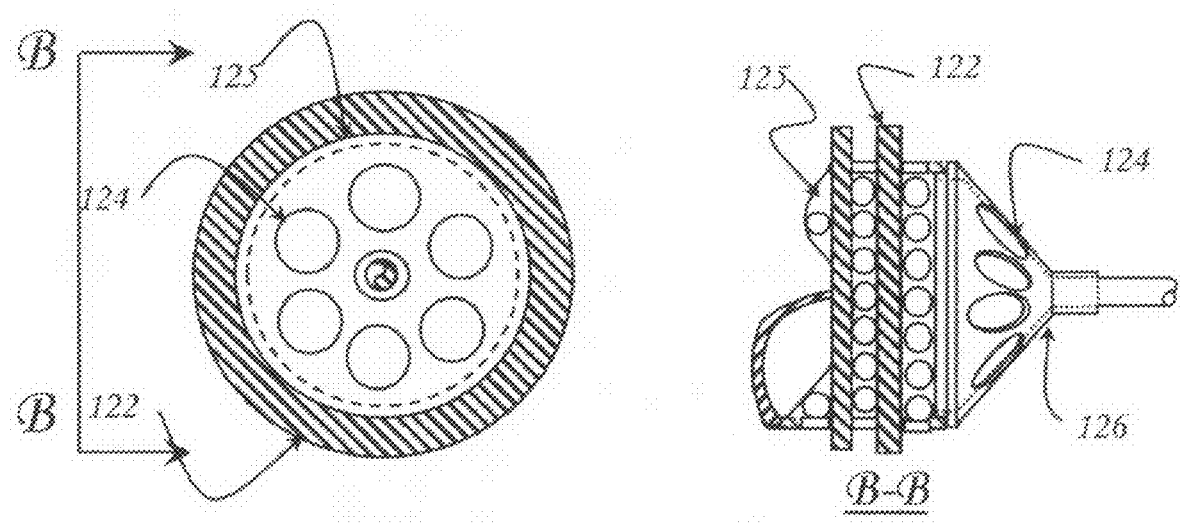
FIG. 6c. a vertical cross section of another embodiment of said coupling attachment having interior placement.

FIG. 6 Boundary layer disk details, FIG. 5*a* is a transverse section of disk (120) having an outer circumference and a inner opening for attachment, with FIG. 5*b*. showing a horizontal cross section A-A through said disk (120), showing a knife edge (121) to the edge of the outer perimeter of the disk to promote stabilization during disk rotation.

Figure 6C:
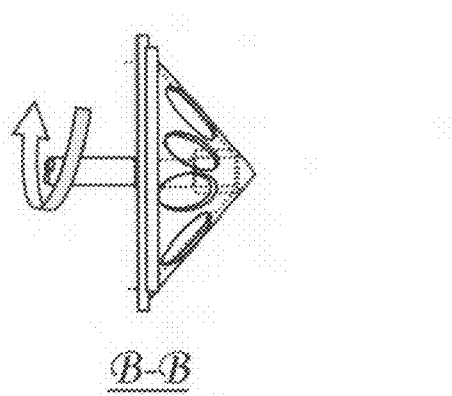

FIG. 6. a first embodiment of the flow conduit coupling attachment; whereas; FIG. 6*a*. is transverse vertical view of said coupling of having plurality of holes (124), arranged about the surface, and an outer retainer support for attachment of the flow conduit (125), supporting said disks (122). FIG. (6*b*) a cross section B-B, of FIG. (6*a*), indicating a extend profile of the coupling prime mover armature attachment (126). FIG. 6*c*) is another embodiment section B-B flow coupling showing a resist profile, of the flow said flow coupling attachment.

Figure 7:
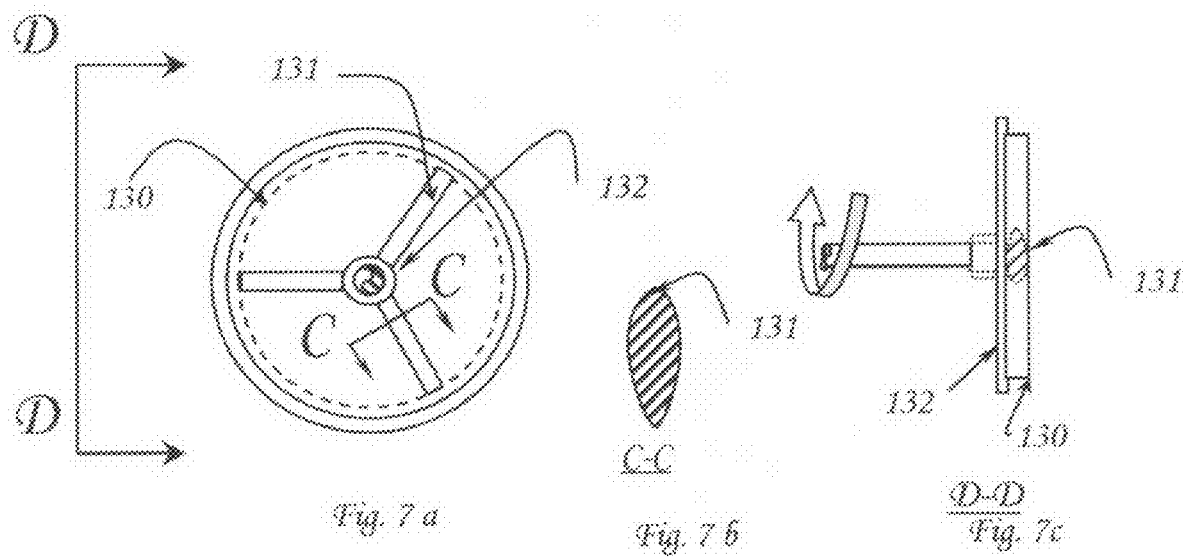
FIG. 7.

FIG. 7. Another simplified embodiment of the flow conduit; FIG. (7*a*) a transverse cross section of said flow coupling having a outer cylindrical for attachment (130), having a central hub (132), for attachment of coupling to prime mover armature shaft;

FIG. 7. the preferred embodiment of the flow conduit coupling, simplified to allow the greatest air flow with the low turbulence comprised of; FIG. (7*a*) having an outer cylindrical attachment (130) with a first open end attached to a circular plate having a wider outer diameter than the said cylindrical attachment (130), with a central opening attached to cylindrical attachment (130), and fixed to a central hub (132), by a plurality of spokes (131), FIG. (7*b*) cross section (C-C), having an air foil shape known to improve air flow and reduce resistance from air impact when moving through a fluid. FIG. (7*c*) arranged in the interior of the said cylinder (130).

What is claimed is:

1. A method for removing gas pollutants from a gas comprising of the following steps; introducing a gas at a velocity and pressure into a cartridge chamber comprised of at least one first fluidized bed reactor supported by a porous substrate with a first inlet filter and at least one second packed bed filter having at least one first inlet and at least one second outlet wherein, said first where first said inlet filter supports said fluidized bed reactor and the second said packed bed filter is retained by the said second outlet filter comprised of porous membrane substrates retaining reactive absorbent media coating, in communication with at least one propulsion apparatus to propel said gas through, said cartridge.

2. The process of claim 1 wherein, said cartridge contains a, said first fluidized bed reactor and a, said second packed bed filter comprising the use of thermally decomposed bicarbonate absorbent to chemically and mechanically alter absorbent media increasing pH and surface porosity through thermal decomposition providing a highly reactive alkaloid carbonate known to absorb acids.

3. A method of claim 1 wherein, said cartridge contains a, said first fluidized bed reactor a, said second packed bed filter using a plurality of alkaline bicarbonate and non alkaline absorbent particles chemically reactive, and mechanically absorbent(s) materials comprising; a thick reactive fluidized bed with particle diameters ranging from at least 65 microns to greater than 150 microns known to support fluidization flow and a highly compressed packed bed filter having a portion of, said particles comprised of previously thermally decomposed alkaline bicarbonates, and non alkaloid absorbent component particles.

4. method of claim 1 wherein a pre-decomposed alkaloid absorbent comprising of pre-treated alkaloid bicarbonates, wherein the bicarbonate are converted into a carbonates, respectively, by subjecting the absorbent to temperatures known above 98° C.

5. The process of claim 4 wherein the bicarbonate has been subjected to temperatures above 98° C. until decomposition occurs causing sublimation of a portion of the particles surfaces creating open pore structures.

6. The process of claim 1 whereby the said gas is introduced by a preferred boundary layer propulsion system comprising; a plurality of parallel surfaces discs radiating from a central situated rotatable tubular axle, having a plurality of openings between, said discs and a first open inlet end and a second drive end with a centrally situated method of attachment to a prime mover to impart rotation generating flow of said gas from a first location to a second location.

7. A method of claim 3 wherein said reactor further includes granulated activated carbon.

8. The process of claim 1 further comprising passing said gas through a second packed bed reactor having an inlet and an outlet, said second reactor retained by a porous membrane wherein said second packed bed filter comprises a absorbent media.

9. A method of claim 1 where a fluid propulsion Apparatus comprising a plurality of parallel spaced solid discs radiating from a central situated rotatable tubular axial, having a plurality of manifold openings in communication with said spaces between said discs, wherein rotation of the axle creates fluid flow into at least one inlet end when imparting rotation from a centrally situated attachment connected to a prime mover per prior is used in the present invention to provide flow and pressures sufficient to generated flow in a fluid (gas) sufficient enough to obtain a fluidized flow and overcome a packed bed filter supported on a filter media substrate while generating low noise into the environment.

* * * * *